(12) United States Patent
Hayashi

(10) Patent No.: US 10,850,543 B2
(45) Date of Patent: Dec. 1, 2020

(54) RECORDING CONTROL DEVICE, RECORDING APPARATUS, AND RECORDING CONTROL METHOD

(71) Applicant: SEIKO EPSON CORPORATION, Tokyo (JP)

(72) Inventor: Takuma Hayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/662,129

(22) Filed: Oct. 24, 2019

(65) Prior Publication Data

US 2020/0130392 A1  Apr. 30, 2020

(30) Foreign Application Priority Data

Oct. 26, 2018  (JP) ................................ 2018-201441

(51) Int. Cl.
*B41J 29/393* (2006.01)
*B41J 2/045* (2006.01)

(52) U.S. Cl.
CPC ........... *B41J 29/393* (2013.01); *B41J 2/0456* (2013.01); *B41J 2/04586* (2013.01)

(58) Field of Classification Search
CPC ..... B41J 29/393; B41J 2/0456; B41J 2/04586
See application file for complete search history.

(56) References Cited

U.S. PATENT DOCUMENTS

| 2003/0048326 | A1* | 3/2003 | Yamasaki | .......... | H04N 1/00063 347/41 |
| 2005/0185012 | A1 | 8/2005 | Yoshida | | |
| 2009/0231376 | A1 | 9/2009 | Moriya | | |
| 2012/0218574 | A1* | 8/2012 | Fukuda | ................ | H04N 1/6097 358/1.9 |

FOREIGN PATENT DOCUMENTS

| JP | 2005-205691 A | 8/2005 |
| JP | 2009-220357 A | 10/2009 |

* cited by examiner

*Primary Examiner* — Lamson D Nguyen
(74) *Attorney, Agent, or Firm* — Global IP Counselors, LLP

(57) ABSTRACT

A recording control device includes: a test pattern recording control unit; a correction value calculating unit that calculates a correction value of the ink amount of each nozzle, based on a reading value of the ink recording area of the recorded test pattern; and a correction recording control unit, in which the maximum ink amount of the ink recording area corresponding to the reading value used by the correction value calculating unit to calculate the correction value is smaller when a medium type of a recording medium on which the test pattern is recorded is a second recording medium in which the ink is easier to bleed than a first recording medium than when the medium type of the recording medium on which the test pattern is recorded is the first recording medium.

6 Claims, 14 Drawing Sheets

FIG. 9

| 17 | | INK COLOR | | | |
|---|---|---|---|---|---|
| | | C | M | Y | K |
| NUMBER n | 1 | CORRECTION VALUE OF 0 TO 255 | CORRECTION VALUE OF 0 TO 255 | CORRECTION VALUE OF 0 TO 255 | CORRECTION VALUE OF 0 TO 255 |
| | 2 | CORRECTION VALUE OF 0 TO 255 | CORRECTION VALUE OF 0 TO 255 | CORRECTION VALUE OF 0 TO 255 | CORRECTION VALUE OF 0 TO 255 |
| | 3 | CORRECTION VALUE OF 0 TO 255 | CORRECTION VALUE OF 0 TO 255 | CORRECTION VALUE OF 0 TO 255 | CORRECTION VALUE OF 0 TO 255 |
| | ⋮ | ⋮ | ⋮ | ⋮ | ⋮ |
| | N | CORRECTION VALUE OF 0 TO 255 | CORRECTION VALUE OF 0 TO 255 | CORRECTION VALUE OF 0 TO 255 | CORRECTION VALUE OF 0 TO 255 |

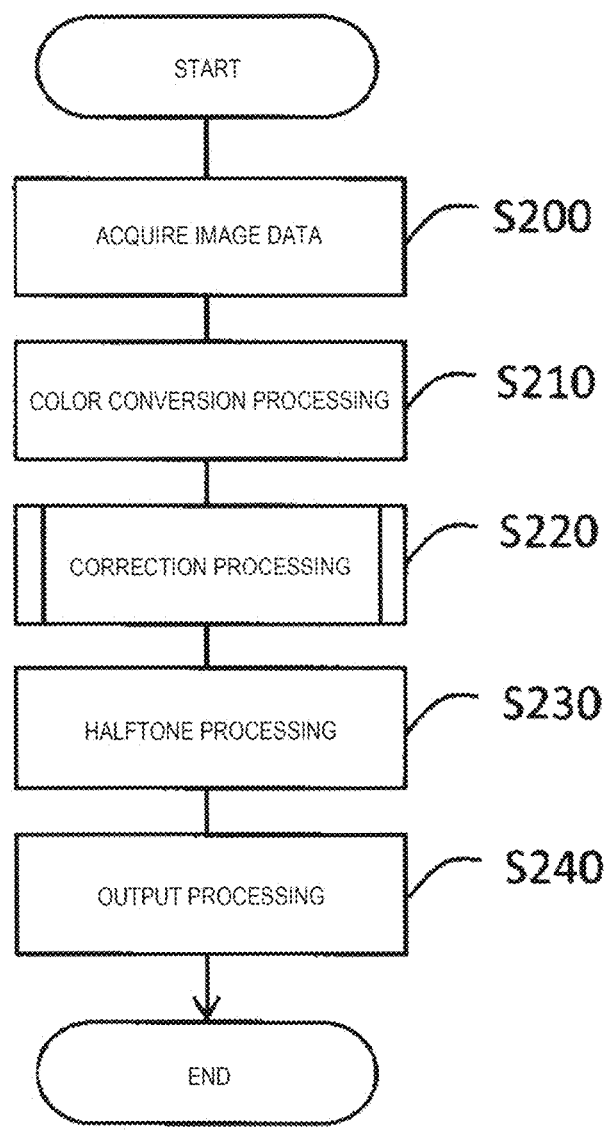

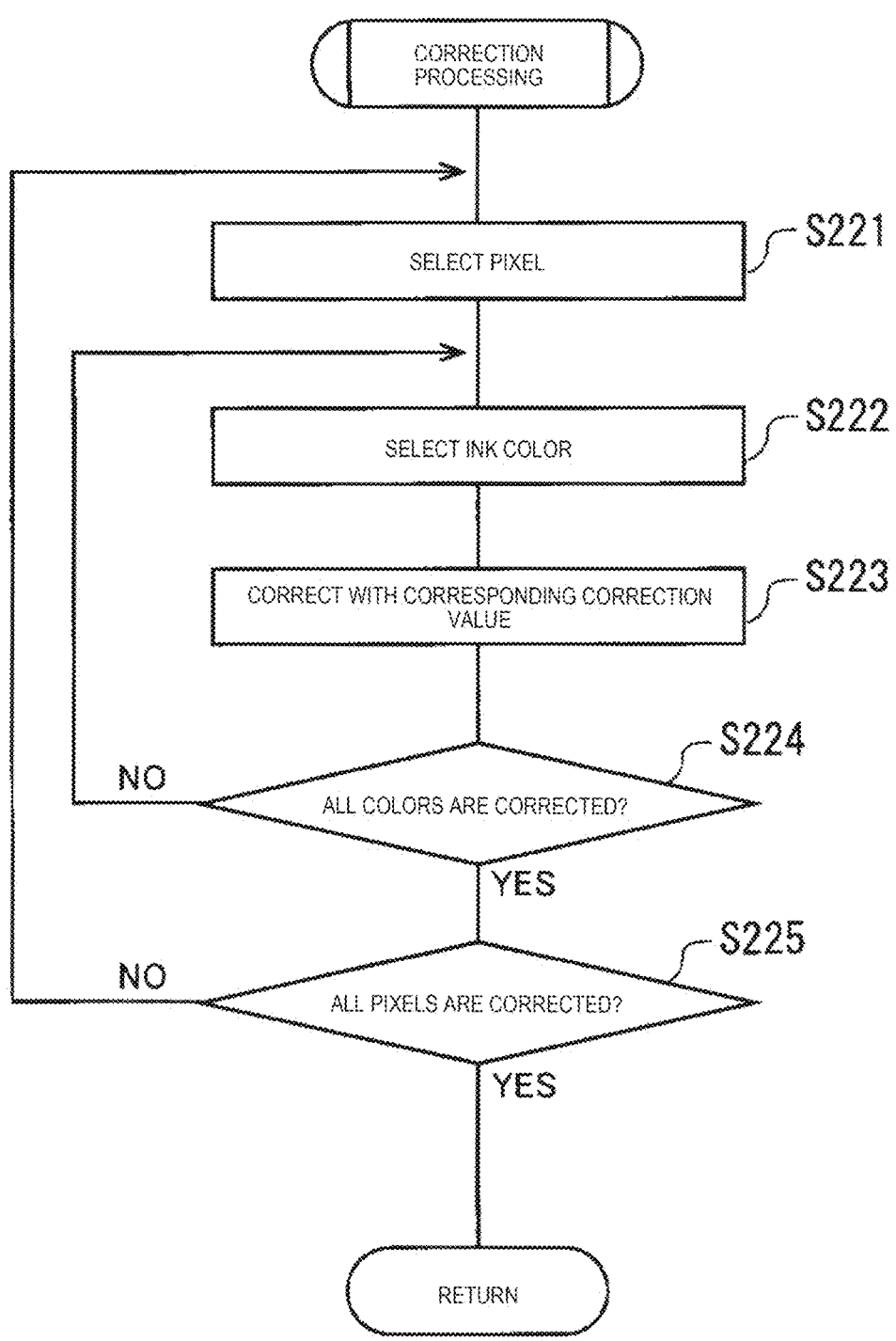

RECORDING CONTROL DEVICE, RECORDING APPARATUS, AND RECORDING CONTROL METHOD

The present application is based on, and claims priority from JP Application Serial Number 2018-201441, filed Oct. 26, 2018, the disclosure of which is hereby incorporated by reference herein in its entirety.

BACKGROUND

1. Technical Field

The present disclosure relates to a recording control device, a recording apparatus, and a recording control method.

2. Related Art

A printing system has been known in which a correction pattern is printed on a medium by an ink jet printer, a correction value is set for each raster line based on a result of reading of the correction pattern, and thus, in a dot forming operation, a dot of the corresponding raster line is formed to have a concentration corrected based on the correction value (see JP-A-2005-205691).

A portion of the correction pattern, which has a high concentration, may be spread depending on characteristics of the medium on which the correction pattern is printed. A problem occurs in that in the correction pattern in which the ink is bleeding, concentration unevenness caused by a difference between discharge characteristics of nozzles of the printer cannot be certainly read, and accordingly, an appropriate correction value for correcting the concentration unevenness cannot be calculated.

SUMMARY

A recording control device, which controls a recording apparatus that performs recording by discharging ink from a plurality of nozzles, includes: a test pattern recording control unit that causes the recording apparatus to record a test pattern including a plurality of ink recording areas having different ink amounts; a correction value calculating unit that calculates a correction value of the ink amount of each nozzle, based on a reading value of the ink recording area of the recorded test pattern; and a correction recording control unit that causes the recording apparatus to record an image in which the ink amount of each nozzle is corrected by the correction value, in which the maximum ink amount of the ink recording area corresponding to the reading value used by the correction value calculating unit to calculate the correction value is smaller when a medium type of a recording medium on which the test pattern is recorded is a second recording medium in which the ink is easier to bleed than a first recording medium than when the medium type of the recording medium on which the test pattern is recorded is the first recording medium.

BRIEF DESCRIPTION OF THE DRAWINGS

FIG. 9 is a diagram showing an example of a correction value table.

FIG. 10 is a flowchart showing recording control processing of an input image.

FIG. 11 is a flowchart showing details of step S220.

DESCRIPTION OF EXEMPLARY EMBODIMENTS

Hereinafter, embodiments of the present disclosure will be described with reference to the accompanying drawings. Each drawing is merely an example for illustrating the present embodiment.

1. Brief Description of System

Figure 1:
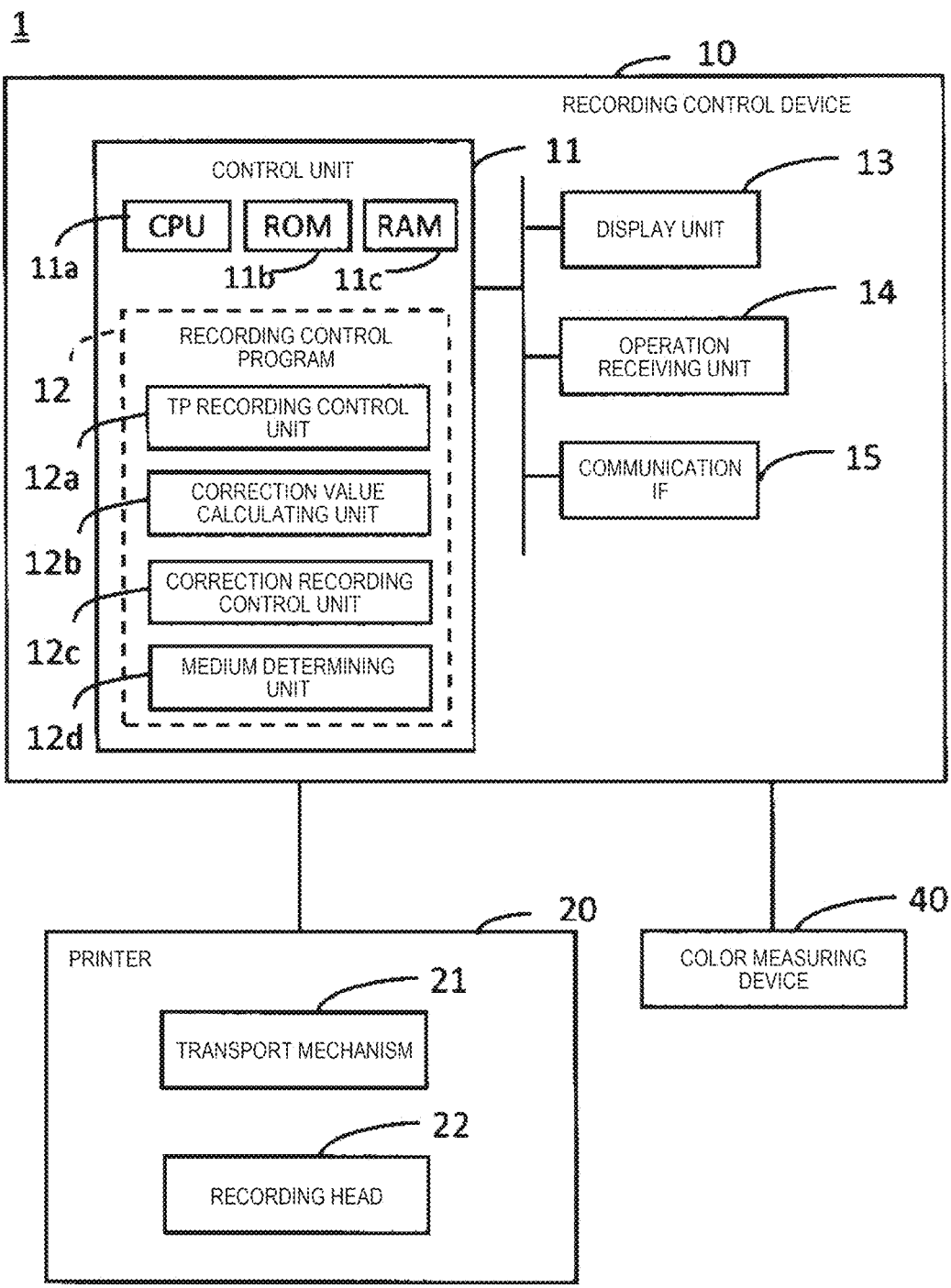
FIG. 1 is a block diagram showing a schematic configuration of a system.

FIG. 1 schematically shows a configuration of a system 1 according to the present embodiment. The system 1 includes a recording control device 10 and a printer 20. The system 1 may be called a recording system, an image processing system, a printing system, and the like.

The recording control device 10 is realized by, for example, a personal computer, a smartphone, a tablet terminal, or an information processing device having the same processing capability as the personal computer, the smartphone, and the tablet terminal. The recording control device 10 includes a control unit 11, a display unit 13, an operation receiving unit 14, a communication interface 15, and the like. The interface is abbreviated as an IF. The control unit 11 includes one or more ICs having a CPU 11a as a processor, a ROM 11b, a RAM 11c, and the like, other non-volatile memories, and the like.

In the control unit 11, the processor, that is, the CPU 11a, executes arithmetic processing according to a program stored in the ROM 11b, other memories, and the like, using the RAM 11c and the like as a working area. For example, the control unit 11 executes processing according to a recording control program 12 to cooperate with the recording control program 12 so as to realize a plurality of functions of a TP recording control unit 12a, a correction value calculating unit 12b, a correction recording control unit 12c, a medium determining unit 12d, and the like. The test pattern is abbreviated as a TP. The processor is not limited to one CPU, and may be configured to perform processing by a plurality of CPUs or hardware circuits such as an ASIC or may be configured such that the CPUs and the hardware circuits cooperate with each other to perform processing.

The display unit 13 is means for displaying visual information, and is configured with, for example, a liquid crystal display, an organic EL display, or the like. The display unit 13 may include a display and a drive circuit for driving the display. The operation receiving unit 14 is means for receiving an operation by a user, and is realized by, for example, a physical button, a touch panel, a mouse, a keyboard, or the like. Of course, the touch panel may be realized as one function of the display unit 13. The display unit 13 and the operation receiving unit 14 together can be called an operation panel for the recording control device 10.

The display unit 13 and the operation receiving unit 14 may be a part of a configuration of the recording control device 10 or may be peripheral devices externally attached to the recording control device 10. The communication IF 15 is a generic name of one or more IFs for causing the recording control device 10 to communicate with the outside in a wired or wireless manner according to a predetermined communication protocol including a widely-known communication standard. The control unit 11 communicates with the printer 20 through the communication IF 15.

Figure 2:
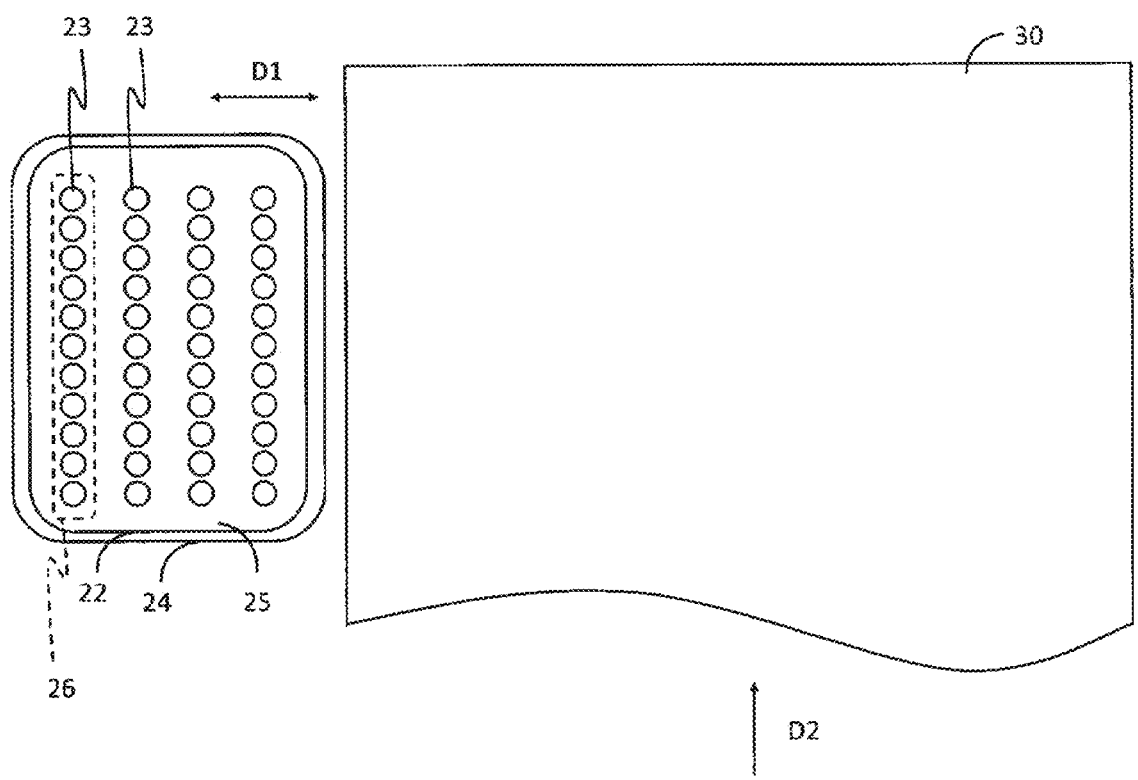
FIG. 2 is a diagram simply showing an example of a relationship between a recording head and a recording medium.
Figure 3:
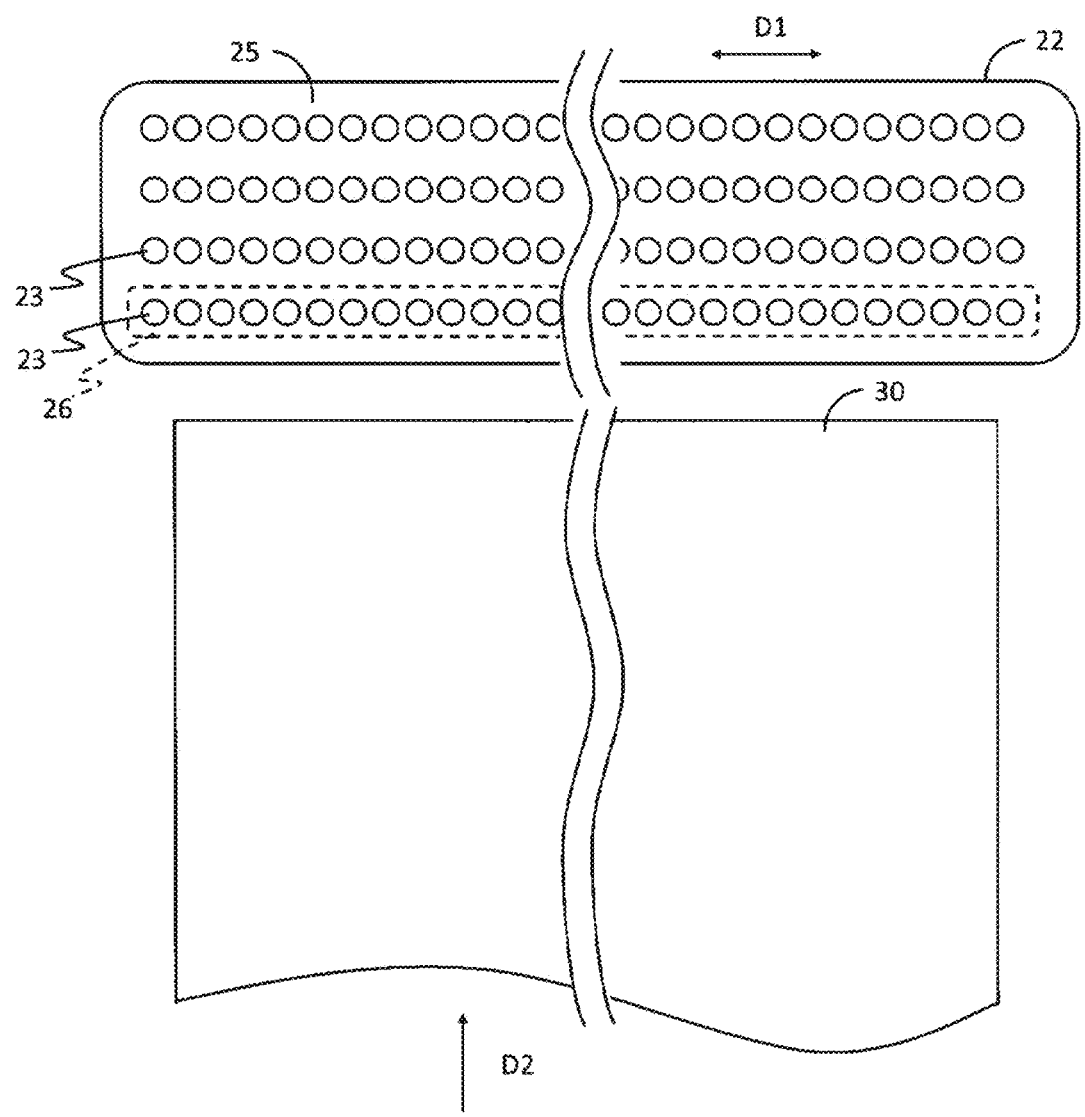
FIG. 3 is a diagram simply showing another example of a relationship between a recording head and a recording medium.

The printer 20 as a recording apparatus controlled by the recording control device 10 is an ink jet printer that performs recording by discharging dots of ink. The dots are also called droplets. Although detailed description of the ink jet printer is omitted, the printer 20 generally includes a transport mechanism 21, a recording head 22, and the like. The transport mechanism 21 transports a recording medium along a predetermined transport direction. As illustrated in FIGS. 2 and 3, the recording head 22 includes a plurality of nozzles 23 that can discharge dots, and discharges the dots from the nozzles 23 to a recording medium 30 transported by the transport mechanism 21. The printer 20 can discharge the dots or cannot discharge the dots from the nozzles 23 by controlling application of drive signals to not-shown drive elements of the nozzles 23 according to dot data which will be described below. The printer 20 performs printing by discharging inks of respective colors of, for example, cyan C, magenta M, yellow Y, and black K, and inks or liquids of colors other than cyan C, magenta M, yellow Y, and black K. In the present embodiment, the printer 20 is described as a model that discharges CMYK inks.

FIG. 2 easily shows a relationship between the recording head 22 and the recording medium 30. The recording head 22 may be called a print head, a printing head, a liquid discharging head, or the like. The recording medium 30 is typically paper, but may be a material other than the paper as long as the material can be recorded by discharging a liquid. The recording head 22 is mounted on a carriage 24 that can reciprocate along a predetermined direction D1, and moves together with the carriage 24. The direction D1 is also referred to as a main scanning direction D1. The transport mechanism 21 transports the recording medium 30 in a direction D2 intersecting with the direction D1. The direction D2 is referred to as a transport direction. Although the term "intersecting" described herein basically means an orthogonal state, for example, the directions D1 and D2 may not be exactly orthogonal to each other due to various errors of the printer 20 as a product. The transport direction D2 is also referred to as a sub scanning direction.

Reference numeral 25 represents a nozzle surface 25 on which the nozzles 23 are opened in the recording head 22. FIG. 2 shows an example of arrangement of the nozzles 23 on the nozzle surface 25. The recording head 22 includes nozzle rows 26 corresponding to the colors of the inks, which receives supply of the inks having CMYK colors from a not-shown ink holding unit called an ink cartridge, an ink tank, or the like mounted on the printer 20, and discharges the inks to the nozzles 23. The nozzle rows 26 are configured with a plurality of nozzles 23 in which a nozzle pitch, which is an interval between the nozzles along the direction D2, is constant. The recording head 22 includes, for example, four nozzle rows 26 corresponding to the CMYK inks. Of course, arrangement of the plurality of nozzles 23 constituting the nozzle row 26 corresponding to one-color ink is not limited to one linear shape as shown in FIGS. 2 and 3, and for example, the nozzles 23 may be divided into a plurality of rows.

According to an example of FIG. 2, the printer 20 realizes recording on the recording medium 30 by alternately repeating transport of the recording medium 30 by the transport mechanism 21 by a predetermined transport amount and discharge of the ink by the recording head 22 according to movement of the carriage 24. The discharge of the ink by the recording head 22 according to the movement of the carriage 24 is also referred to as scanning or passing. According to the example of FIG. 2, the printer 20 is a serial printer in which the recording head 22 mounted on the carriage 24 that reciprocates in the direction D1 intersecting with the direction D2 performs recording.

However, the printer 20 may be a line printer as shown in FIG. 3, in which the recording head 22 that is long along the direction D1 intersecting with the direction D2 performs recording.

A difference between FIG. 2 and FIG. 3 will be briefly described. According to an example of FIG. 3, the nozzle rows 26 on the nozzle surface 25 are configured with the plurality of nozzles 23 in which a nozzle pitch is constant along the direction D1. The nozzle rows 26 have a length corresponding to the width of the recording medium 30 in the direction D1, and the recording head 22 having the plurality of nozzle rows 26 according to the colors of the inks is fixed without being mounted on the carriage 24. Then, according to the example of FIG. 3, the printer 20 discharges, by the recording head 22, the inks to the recording medium 30 being transported by the transport mechanism 21 at a predetermined speed.

The recording control device 10 is further communicably connected to a color measuring device 40. The color measuring device 40 is a generic name of devices for measuring the color of the recording medium 30. The color measuring device 40 is, for example, a dedicated color measuring device or a scanner that optically reads an object to generate image data. The color measuring device 40 may be a part of the recording control device 10.

The recording control device 10 and the printer 20 may be connected to each other through a not-shown network. The printer 20 may be a multifunctional machine having various functions such as a scanner function and a facsimile communication function in addition to a printing function. The recording control device 10 may be realized by not only one independent information processing device but also a plurality of information processing devices communicably connected to each other through a network.

Alternatively, the recording control device 10 and the printer 20 may be an integrated device. That is, the recording control device 10 is a part of a configuration included in the printer 20 as a recording apparatus, and processing performed by the recording control device 10, which will be described below, may be interpreted as processing performed by the printer 20.

2. First Embodiment

Figure 4:
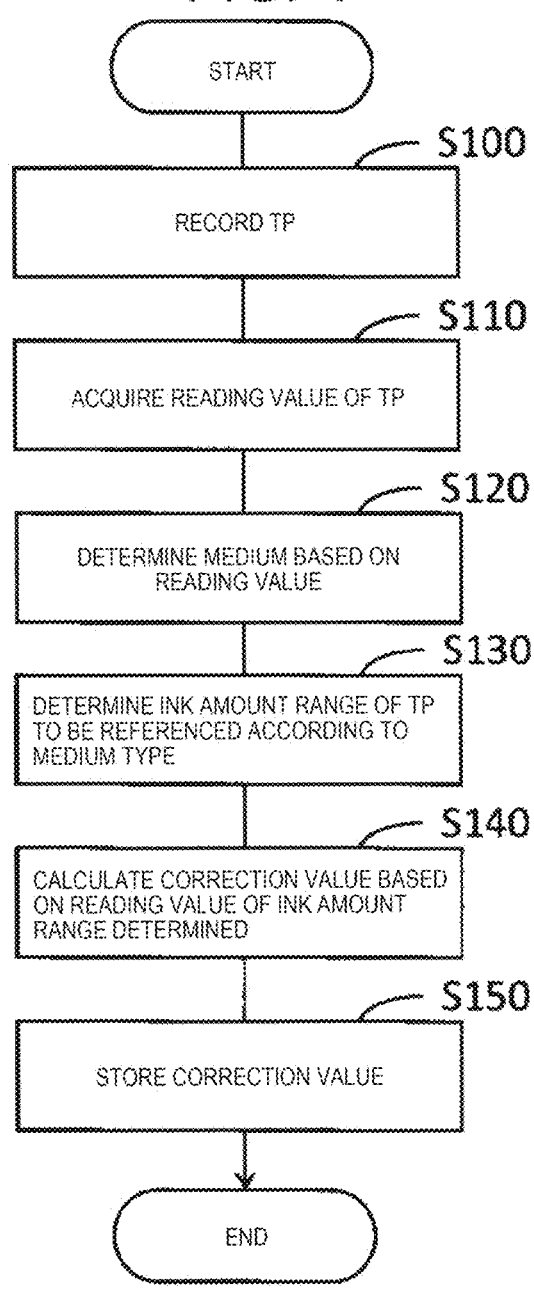
FIG. 4 is a flowchart showing correction value acquiring processing according to a first embodiment.

FIG. 4 is a flowchart showing correction value acquiring processing according to a first embodiment, which is realized by the control unit 11 according to the recording control program 12. In the present embodiment, at least some of steps shown in the flowchart show steps of the recording control method. A correction value is information for suppressing the concentration unevenness caused by a difference between discharge characteristics of the nozzles 23 of the printer 20.

In step S100, the TP recording control unit 12a causes the printer 20 to record the TP including various concentration areas having different amounts of the inks. The concentration area is an area recorded by the ink, and thus is also referred to as an "ink recording area". TP data, which is image data representing the TP, is prepared in advance in a predetermined memory or the like. The TP data is bitmap data of which each pixel has a gradation value (for example, 256 gradations of 0 to 255) indicating the amount of each CMYK ink. The TP recording control unit 12a performs halftone processing on the TP data. A specific method of the halftone processing is not particularly limited, and a dither method, an error diffusion method, or the like may be employed as the halftone processing. Dot data defining discharge (dot-on) or non-discharge (dot-off) of dots of the CMYK inks for each pixel is generated by the halftone processing.

The TP recording control unit 12a rearranges the generated dot data in an order in which the dot data is to be transferred to the printer 20 according to a predetermined recording method. The processing of the rearrangement is also referred to as rasterization processing. The recording method described herein is a recording method which the printer 20 adopts with respect to moving methods for the transport mechanism 21 and the recording head 22. When the recording method is different, the one-time transport amount by the transport mechanism 21 between paths, the number of times of paths required for recording on one recording medium 30, and the like are different. Thus, by the rasterization processing, it is determined by which nozzle 23 and at which timing the dots of the inks defined by the dot data are discharged according to the position of the pixel and the color of the ink. The TP recording control unit 12a transmits the dot data obtained after the rasterization processing to the printer 20. Accordingly, the printer 20 executes the recording of the TP on the recording medium 30 based on the dot data transmitted from the recording control device 10.

Figure 5:
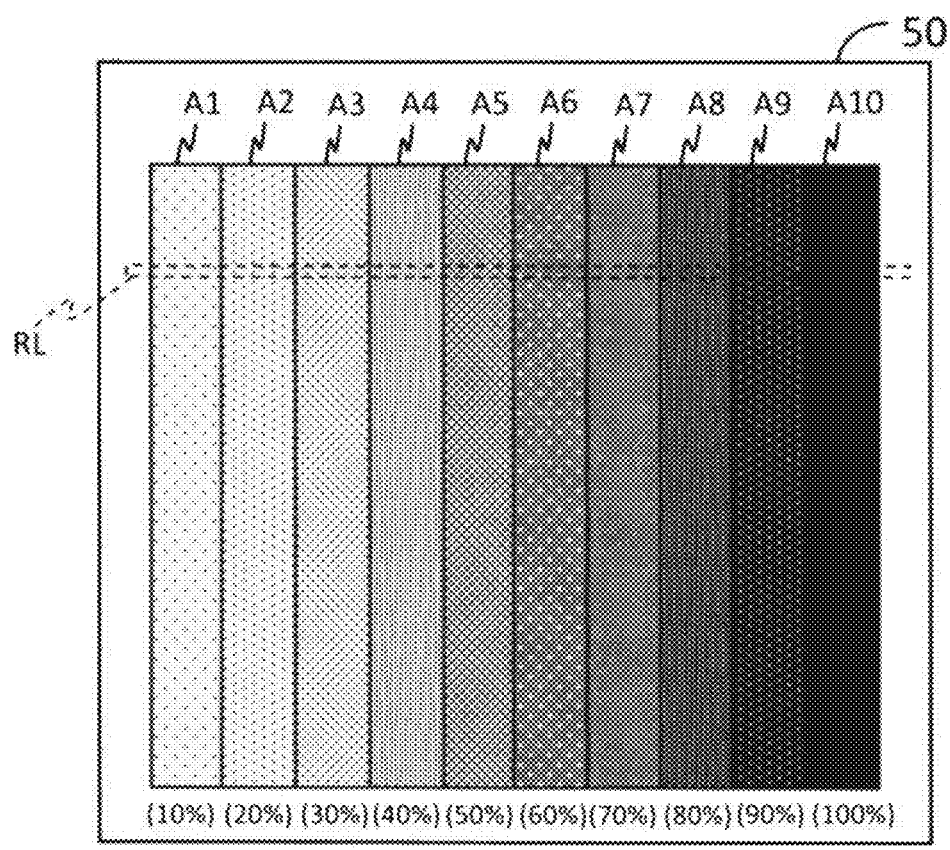
FIG. 5 is a diagram showing an example of a test pattern.

FIG. 5 shows a TP 50 recorded on the recording medium 30 in step S100. In the TP 50, a plurality of long ink recording areas A1, A2, A3, A4, A5, A6, A7, A8, A9, and A10 are arranged in a short direction of each ink recording area. The ink recording areas A1 to A10 included in the TP 50 have mutually different amounts of inks, and are recorded by the same one-color ink. In the TP 50 shown in FIG. 5, it is assumed that all the ink recording areas A1 to A10 are recorded by K ink. In FIG. 5, for convenience of understanding, the amounts of the inks of the ink recording areas A1 to A10 are converted into values (Duty) in a numerical value range from the minimum value 0% to the maximum value 100%, and are illustrated in parentheses. That is, the amounts of the inks may be replaced with Duty. The ink recording area A1 having the smallest amount of the ink has a Duty of 10%, and the other ink recording areas A2 to A10 having the amount of the ink that is larger than that of the ink recording area A1 have higher Duties at intervals of 10%.

The Duty of the ink recording area means a ratio of dot-on pixels in the area or a coverage of the ink to the area. In the TP data representing the TP 50, each of the ink recording areas A1 to A10 is a set of pixels having the gradation values corresponding to the respective Duties. The numerical value range from 0% to 100% can be normalized to the gradation range from 0 to 255. Thus, in the TP data representing the TP 50, the ink recording area A1 is formed by collecting, for example, pixels having a gradation value "26" of K corresponding to the Duty of 10%, that is, pixels of (C, M, Y, K)=(0, 0, 0, 26). Thus, in the TP data representing the TP 50, the ink recording area A10 is formed by collecting, for example, pixels having a gradation value "255" of K corresponding to Duty of 100%, that is, pixels of (C, M, Y, K)=(0, 0, 0, 255).

The TP recording control unit 12a causes the printer 20 to record the TP 50 in a direction in which each nozzle 23 of the nozzle row 26 corresponding to the K ink of the recording head 22 records the ink recording areas A1, A2, A3, A4, A5, A6, A7, A8, A9, and A10. When the printer 20 is a serial printer as described in FIG. 2, the TP recording control unit 12a records the TP 50 on the recording medium 30 in a state in which a short direction of each ink recording area corresponds to the direction D1 and a longitudinal direction of each ink recording area corresponds to the direction D2. Meanwhile, when the printer 20 is a line printer as described in FIG. 3, the TP recording control unit 12a records the TP 50 on the recording medium 30 in a state in which the short direction of each ink recording area corresponds to the direction D2 and the longitudinal direction of each ink recording area corresponds to the direction D1.

In FIG. 5, an area indicated by a broken line illustrates a raster line RL. The raster line RL is a part of an image, and is an area in which pixels recorded by one nozzle 23 through which the K ink is discharged are aligned in a predetermined direction. That is, in step S100, the TP recording control unit 12a causes each of the nozzles 23 at different positions in a longitudinal direction of the nozzle row 26 to record one raster line RL, thereby recording the TP 50 which is a bundle of raster lines RL.

In step S110, the correction value calculating unit 12b acquires a reading value of the TP recorded in step S100. In this case, the color measuring device 40 measures the color of the TP recorded on the recording medium 30, and the correction value calculating unit 12b acquires the reading value that is a result of the color measurement, from the color measuring device 40. A color system that is adopted by the reading value acquired by the correction value calculating unit 12b is not particularly limited. For example, the correction value calculating unit 12b acquires, as the reading value, color values represented by L*, a*, and b* components of the CIE L*a*b* color space defined by the International Commission on Illumination (CIE), or acquires, as the reading value, image data represented by RGB (red, green, and blue) components from the color measuring device 40 that is a scanner.

In step S120, the correction value calculating unit 12b determines the type of the recording medium 30 on which the TP is recorded in step S100, that is, a medium type, based on the reading value acquired in step S110. In the present embodiment, the medium type means different types according to bleeding easiness of the ink.

For example, when the bleeding easiness of the ink is compared between a dedicated paper sheet for ink jet printing, a plain paper sheet, and a recycled paper sheet, the dedicated paper sheet has the lowest bleeding easiness of the ink, and the recycled paper sheet has the highest bleeding easiness of the ink. In the present embodiment, when one medium type among different medium types is called a first recording medium, a medium type having the bleeding easiness of the ink, which is higher than that of the first recording medium, is called a second recording medium. For example, when the dedicated paper sheet is grasped as the first recording medium, the plain paper sheet and the recycled paper sheet correspond to the second recording medium. For example, when the plain paper sheet is grasped as the first recording medium, the recycled paper sheet corresponds to the second recording medium. The fact that the ink is easy to bleed means a state in which the ink is likely to penetrate the medium and the dots of the ink are likely to be mixed with each other.

Figure 6:
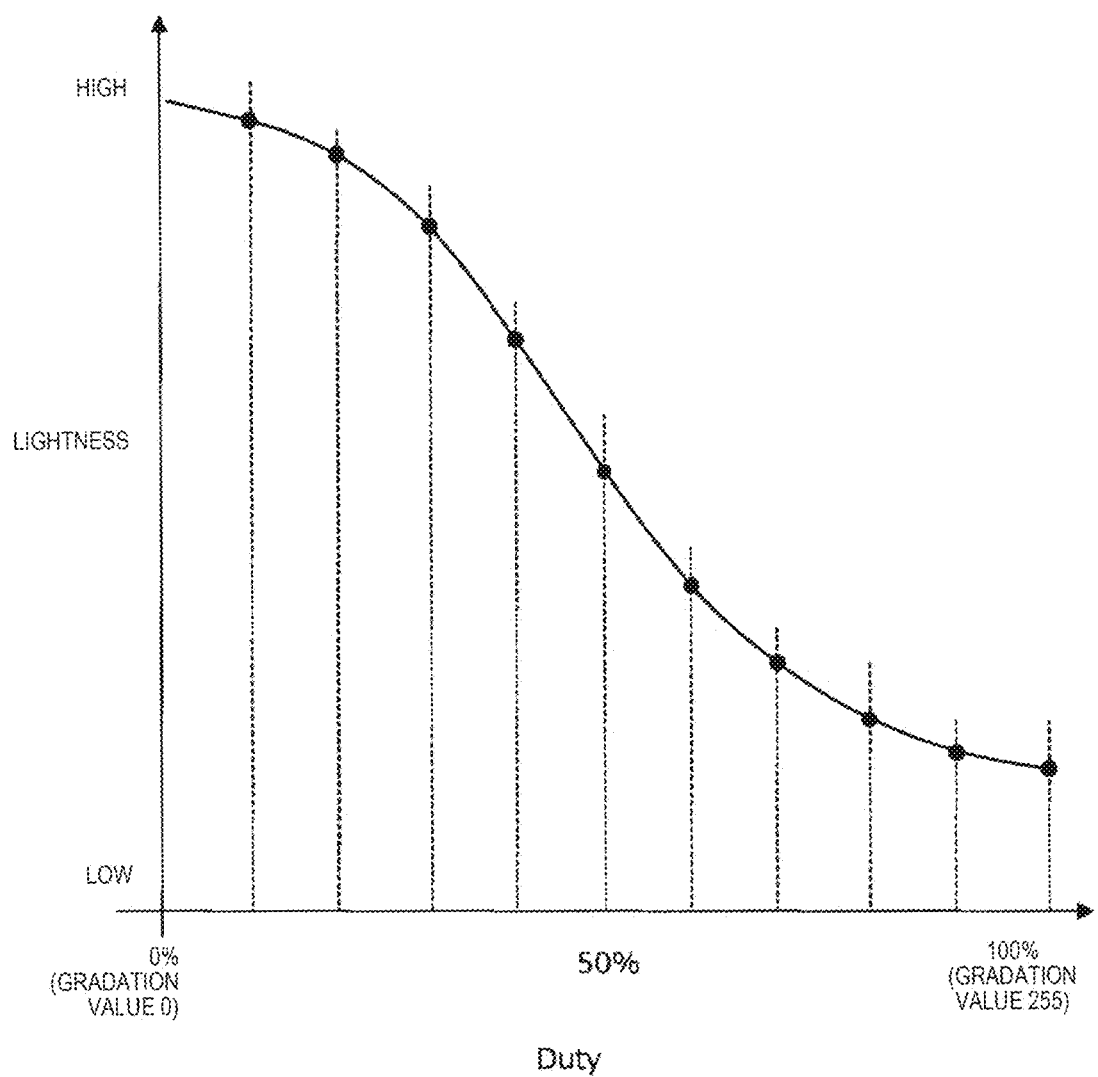
FIG. 6 is a graph depicting a read value of the test pattern recorded on a recording medium.

FIG. 6 is a graph depicting the reading value acquired in step S110. In FIG. 6, a transverse axis represents the Duties of the ink recording areas A1 to A10 of the TP 50, and a vertical axis represents lightness as the reading value. The lightness as the reading value is a lightness L* input from the color measuring device 40. Alternatively, the lightness as the reading value may be a value calculated by the control unit 11 based on information input from the color measuring device 40, for example, a value obtained by weighting the RGB components.

In the graph of FIG. 6, 10 black circles arranged at regular intervals in a transverse axis direction indicate the lightness of the ink recording areas A1 to A10 of the TP 50, respectively. The lightness of the ink recording area, indicated by the black circle, is, for example, an average value of the lightness of the ink recording area in the raster line RL recorded by one nozzle 23 of the nozzle row 26 corresponding to the K ink of the recording head 22. Alternatively, the lightness of the ink recording area, indicated by the black circle, is, for example, an average value of the lightness of the ink recording area in the plurality of raster lines RL recorded by the plurality of nozzles 23 of the nozzle row 26 corresponding to the K ink of the recording head 22. A curved line connecting these black circles corresponds to a function generated by the correction value calculating unit 12b by interpolation calculation of the lightness of the ink recording areas A1 to A10. Of course, the interpolation calculation may be linear interpolation. As understood from FIG. 6, the lightness of the ink recording areas A1 to A10 decreases as the Duties of the ink recording areas A1 to A10 increase.

Figure 7:
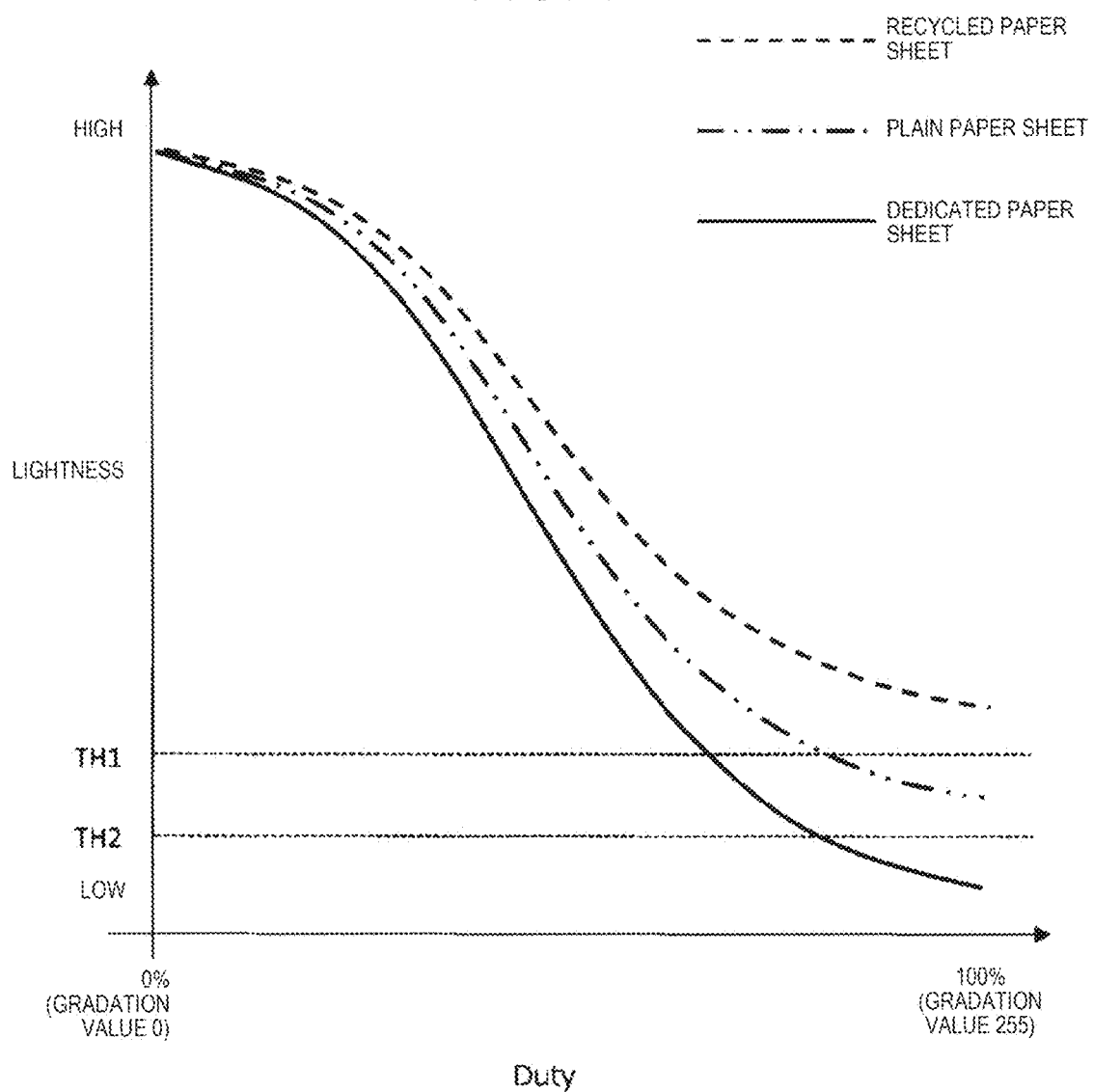
FIG. 7 is a graph depicting read values of test patterns for different medium types.

FIG. 7 is a graph depicting the reading value of the TP 50 for each recording medium 30 when the printer 20 records the TP 50 on different medium types of the recording media 30, which is like FIG. 6. In detail, a function indicated by a broken line in FIG. 7 indicates the reading value of the TP 50 recorded, by the printer 20, on the recording medium 30 that is the recycled paper sheet. In FIG. 7, a function indicated by a two-dot chain line indicates the reading value of the TP 50 recorded, by the printer 20, on the recording medium 30 that is the plain paper sheet. In FIG. 7, a function indicated by a solid line indicates the reading value of the TP 50 recorded, by the printer 20, on the recording medium 30 that is the dedicated paper sheet.

In the medium type in which the ink is easy to bleed, particularly in a high Duty area where a large amount of the ink is recorded, a change in the color becomes scarce. According to an example of FIG. 7, in the lightness of the TP 50 recorded on the recycled paper sheet, a decrease rate becomes smaller with respect to the increase in the Duty from the vicinity of an area where the Duty corresponding to the transverse axis exceeds 50% in the middle. In contrast, in the medium type in which the ink is difficult to bleed, the color relatively largely changes even in the high Duty area. According to the example of the FIG. 7, the lightness of the TP 50 recorded on the dedicated paper sheet is greatly reduced as compared to the recycled paper sheet and the plain paper sheet, even after the Duty corresponding to the transverse axis exceeds 50% in the middle.

Thus, in step S120, the correction value calculating unit 12b determines the medium type of the recording medium 30, on which the TP is recorded in step S100, based on the reading value corresponding to the high Duty area among the reading values acquired in step S110. For example, the correction value calculating unit 12b compares the lightness, which is the reading value of the ink recording area A10 corresponding to the Duty of 100% among the reading values acquired in step S110, with predetermined threshold values TH1 and TH2. TH1>TH2. The threshold value TH1 is a value for identifying the lightness of the ink recording area A10 on the recycled paper sheet and the lightness of the ink recording area A10 on the plain paper sheet. The threshold value TH2 is a threshold value for identifying the lightness of the ink recording area A10 on the plain paper sheet and the lightness of the ink recording area A10 on the dedicated paper sheet. When the lightness of the ink recording area A10 is higher than the threshold value TH1, the correction value calculating unit 12b determines that the medium type is the "recycled paper sheet". When the lightness of the ink recording area A10 is equal to or lower than the threshold value TH1 and is higher than the threshold value TH2, the correction value calculating unit 12b determines that the medium type is the "plain paper sheet". When the lightness of the ink recording area A10 is equal to or lower than the threshold value TH2, the correction value calculating unit 12b determines that the medium type is the "dedicated paper sheet".

Alternatively, the correction value calculating unit 12b may determine the medium type based on a difference between the reading values of the plurality of ink recording areas corresponding to the high Duty area. For example, the correction value calculating unit 12b calculates a difference (a lightness difference) between the lightness of the ink recording area A7 corresponding to the Duty of 70% and the lightness of the ink recording area A10 corresponding to the Duty of 100%, among the reading values acquired in step S110. Then, the correction value calculating unit 12b determines the medium type by, for example, comparing the lightness difference with a predetermined threshold value. Since the lightness difference tends to have the smaller value as the medium type in which the ink is easier to bleed, the correction value calculating unit 12b can determine the medium type of the recording medium 30, on which the TP is recorded in step S100, according to the lightness difference.

In step S130, the correction value calculating unit 12b determines an ink amount range of the TP to be referenced for calculation of the correction value according to the medium type determined in step S120. To reference the TP for the calculation of the correction value means that the reading values are used to calculate the correction value. In the first embodiment, the minimum value of the ink amount range of the TP to be referenced for the calculation of the correction value, that is, the minimum ink amount, is determined as the Duty of 10% of the ink recording area A1 in the case of the minimum Duty in the TP, that is, the TP 50 of FIG. 5. Therefore, step S130 is substantially processing of determining the maximum ink amount of the TP to be referenced for the calculation of the correction value.

Figure 8:
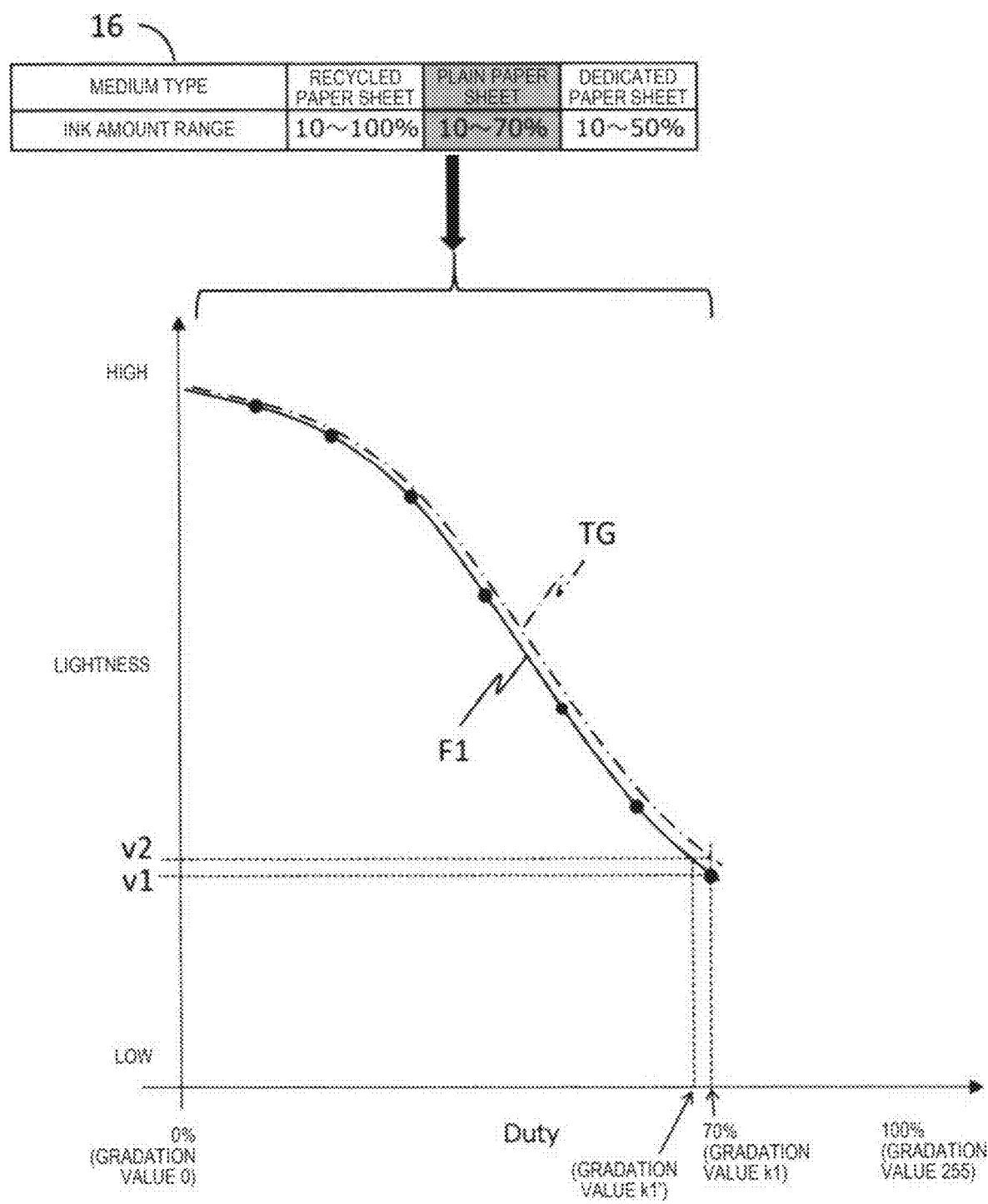
FIG. 8 is a diagram for illustrating examples of steps S130 and S140.

FIG. 8 is a diagram for illustrating examples of steps S130 and S140.

An upper part of FIG. 8 shows an ink amount range table 16 defining a correspondence between the medium type and the ink amount range of the TP. The ink amount range table 16 is stored in, for example, the predetermined memory in the recording control device 10 in advance. The correction value calculating unit 12b determines the ink amount range of the TP to be referenced for the calculation of the correction value, based on the medium type determined in step S120 and the ink amount range table 16. In the ink amount range table 16 of FIG. 8, the ink amount is indicated by the Duty. According to the ink amount range table 16, the correction value calculating unit 12b determines the ink amount range to the Duty of 10% to 100% when the medium type is the dedicated paper sheet, determines the ink amount range to the Duty of 10% to 70% when the medium type is the plain paper sheet, and determines the ink amount range to the Duty of 10% to 50% when the medium type is the recycled paper sheet. The maximum ink amount (the maximum Duty) of the ink amount range for each medium type defined in the ink amount range table 16 has a smaller value as the corresponding medium type is a medium type in which the ink is easier to bleed. The maximum Duty of the ink amount range according to each medium type defined by the ink amount range table 16 is an upper limit of the Duty at which it is recognized that the ink does not bleed in the corresponding medium type.

As described above, in step S130, the correction value calculating unit 12b sets the maximum ink amount of the TP to be referenced for the calculation of the correction value to a smaller value as the recording medium 30 on which the TP is recorded by the printer 20 in step S100 is a medium type in which the ink is easier to bleed. This is because in the reading values obtained by reading a result of the recording in a state in which the ink bleeds, the concentration unevenness according to changes in discharge characteristics for each nozzle 23, which should originally appear, does not correctly appear. Even when the reading values as a result of the color measurement of the TP, at which the concentration unevenness cannot be correctly expressed, are used for calculating the correction value, an appropriate correction value for correcting the concentration unevenness cannot be obtained.

In step S140, the correction value calculating unit 12b calculates the correction value for correcting the ink amount of each nozzle 23, based on the reading value of the ink recording area of the ink amount range determined in step S130 among the reading values of the TP acquired in step S110. FIG. 8 shows a case where the ink amount range is determined as the Duty of 10% to 70% in step S130, and as a result, the ink amount range corresponding to the reading value used to calculate the correction value in step S140 is limited to the Duty of 10% to 70%.

A lower part of FIG. 8 shows a graph depicting the reading value acquired in step S110. The viewpoint of the graph is the same as that of FIGS. 6 and 7. In the graph of FIG. 8, 7 black circles arranged at regular intervals in the transverse axis direction indicate the lightness of the ink recording areas A1 to A7 of the TP 50, respectively. In the graph of FIG. 8, the lightness of the ink recording area, indicated by the black circle, is an average value of the lightness of the ink recording area in the raster line RL recorded by one nozzle 23 of the nozzle row 26 corresponding to the K ink of the recording head 22. The one nozzle 23 is referred to as an "object nozzle" for convenience of description of step S140. In the graph of FIG. 8, a solid line connecting seven black circles is a function F1 generated by the interpolation calculation, which indicates a change in the lightness reproduced on the recording medium 30 by the object nozzle corresponding to the Duty of 0% to 70% of the K ink. The correction value calculating unit 12b calculates a correction value for the object nozzle.

In the present embodiment, it is assumed that the nozzle row 26 corresponding to one ink color in the recording head 22 includes N nozzles 23 along the longitudinal direction of the nozzle row 26. For convenience of description, nozzle numbers n (n=1 to N) are assigned to the N nozzles 23 in an order from one end side to the other end side of the nozzle row 26 in the longitudinal direction. The correction value calculating unit 12b associates the reading value of each raster line RL included in the reading value of the TP acquired in step S110 with the nozzle number n, to determine by which nozzle 23 the reading value of one raster line RL is the reading value of a result of the recording.

In the graph of FIG. 8, a function TG indicated by a dashed line is a curved line generated by performing the interpolation calculation on the lightness of each ink recording area in the raster line RL recorded by the target nozzle. The target nozzle is also one of the nozzles 23 included in the nozzle row 26 corresponding to the K ink of the recording head 22. The correction value calculating unit 12b designates, as the target nozzle, for example, the nozzle 23 having the brightest reading value among the nozzles 23 included in the nozzle row 26 corresponding to the K ink, based on the reading value of the TP 50 acquired in step S110. As in the example of FIG. 8, when the highest Duty of the ink amount range of the TP 50 to be referenced for calculating the correction value is set as 70%, the correction value calculating unit 12b designates, as the target nozzle, the nozzle 23 having the highest reading value (the lightness) of the ink recording area A7 corresponding to the Duty of 70%. The target nozzle serves as a reference for correction of the object nozzle.

As shown in the graph of FIG. 8, the lightness indicated by the function F1 and corresponding to the Duty of 70% is lightness v1, and the lightness indicated by the function TG and corresponding to the Duty of 70% is lightness v2. In this case, the correction value calculating unit 12b sets a Duty for obtaining the lightness v2 by the function F1 as a Duty obtained after correction of the Duty of 70%. When the gradation value in a range of the 256 gradations, corresponding to the Duty of 70%, is "k1", and the gradation value in the range of the 256 gradations, corresponding to the Duty obtained after the correction of the Duty of 70%, is "k1'", the correction value calculating unit 12b sets a value of k1'-k1 as a correction value for the gradation value k1. For example, when k1=170, and k1'=165, a value of "−5" is the correction value for the gradation value k1. The correction value calculating unit 12b calculates correction values for all gradations 0 to k1 which are equal to or less than the gradation value k1, using the function F1 and the function TG.

The correction value calculating unit 12b may calculate a correction value for a gradation value outside ranges of the functions F1 and TG by, for example, copying the already calculated correction values and performing the linear interpolation on the already calculated correction values. In the example of FIG. 8, the correction value calculating unit 12b may copy the correction value for the gradation value k1 as a correction value for each of the gradation values k1+1 to 255.

The correction value calculating unit 12b calculates correction values for all gradation values in the range of the 256 gradations of the nozzles 23 except the target nozzle among the nozzles 23 included in the nozzle row 26 corresponding to the K ink by sequentially setting, as the object nozzle, the nozzles 23 except the target nozzle among the nozzles 23 included in the nozzle row 26 corresponding to the K ink.

In step S150, the correction value calculating unit 12b stores the correction values calculated in step S140 as described above in the predetermined memory of the recording control device 10.

Of course, the control unit 11 determines object nozzles and target nozzles for the nozzle rows 26 corresponding to CMY inks other than the K ink, and calculates and stores correction values for the object nozzles as described above. That is, in step S100, the control unit 11 causes the printer 20 to execute not only the recording of the TP by the K ink but also recording of the TP by each of C, M, and Y inks, and similarly execute step S110 and subsequent steps. However, the processing in steps S120 and S130 may be performed based on the reading value of the TP recorded with any one of the CMYK inks.

FIG. 9 shows a correction value table 17 stored in the recording control device 10 as a result of step S150. The correction value table 17 stores the correction value calculated in step S140, that is, the correction value for each ink color of the CMYK inks and for each nozzle number n (n=1 to N). In FIG. 9, the "correction value of 0 to 255" is an expression obtained by summarizing existence of each correction value for each gradation value from 0 to 255. However, in each of the CMYK inks, the correction value is not stored for the nozzle number n corresponding to the target nozzle among the nozzle numbers of 1 to N.

FIG. 10 is a flowchart showing recording control processing for causing the printer 20 to execute recording of an input image selected in an arbitrary manner. The recording control processing is also realized by the control unit 11 according to the recording control program 12. The recording control processing involves correction processing using the correction value calculated as described above.

For example, a user operates the operation receiving unit 14 while visually recognizing a user interface screen displayed on the display unit 13, to select image data representing the input image in an arbitrary manner. A user interface is abbreviated as UI. In step S200, the correction recording control unit 12c acquires the image data selected by the user in an arbitrary manner, from a predetermined input source.

The image data obtained in step S200 is bitmap data having a plurality of pixels, which is like the TP data. For example, the bitmap data has RGB gradation values (for example, 256 gradations from 0 to 255) for each pixel. Further, when the acquired image data does not correspond to such an RGB color system, the correction recording control unit 12c converts the acquired image data into data of the corresponding color system. Further, the correction recording control unit 12c appropriately executes resolution conversion processing and the like such that the image data is matched with a printing resolution adopted by the printer 20.

In step S210, the correction recording control unit 12c executes color conversion processing on the image data obtained after step S200. That is, the color system of the image data is converted into the color system of the ink used for the recording by the printer 20. As described above, when the image data expresses the color of each pixel as gradation by the RGB components, in each pixel, the gradation value of the RGB components is converted into the gradation value of the CMYK components. The color conversion processing can be performed with reference to an arbitrary color conversion lookup table defining a conversion relationship from the RGB components to the CMYK components.

In step S220, the correction recording control unit 12c corrects the color-converted image data obtained in step S210 using the correction value stored in the correction value table 17.

FIG. 11 is a flowchart showing details of the correction processing in step S220.

In step S221, the correction recording control unit 12c selects one pixel to be corrected from the plurality of pixels constituting the image data.

In step S222, the correction recording control unit 12c selects one gradation value of the ink color to be corrected from the graduation values of the CMYK components included in the pixel selected in step S221.

In step S223, the correction recording control unit 12c reads out, from the correction value table 17, the correction value corresponding to the nozzle 23 to which the pixel selected in step S221 is allocated and the ink color selected in step S222, and corrects the graduation value of the ink color selected in step S222 based on the read-out correction value. The correction recording control unit 12c determines to which nozzle 23 the pixels constituting the image data are allocated, based on the recording method adopted by the printer 20. For example, it is assumed that in step S221, the pixel corresponding to the nozzle number n=10 is selected, and in step S222, the gradation value of the K ink of this pixel, for example, the gradation value=50, is selected. In this case, in step S223, the correction recording control unit 12c reads out, from the correction value table 17, the correction value corresponding to the K ink and the nozzle number n=10 and for the correction of the gradation value=50.

In step S224, the correction recording control unit 12c determines whether or not the gradation values of all the ink colors CMYK of the pixel selected in step S221 are completely corrected in step S223. When there is an ink color which is not completely corrected, the process returns to step S222, and a gradation value to be applied to an uncorrected ink color is newly selected. Meanwhile, when the gradation values of all the ink colors CMYK are completely corrected in step S223, the process proceeds to step S225.

In step S225, the correction recording control unit 12c determines whether or not all the pixels constituting the image data are completely corrected. When there is a pixel that is not completely corrected, the process returns to step S221, and an uncorrected pixel is newly selected. Meanwhile, when all the pixels are completely corrected, the correction processing of step S220 is completed.

In step S230, the correction recording control unit 12c performs the halftone processing on the image data obtained after the correction processing of step S220, to generate the dot data.

In step S240, the correction recording control unit 12c performs output processing that causes the printer 20 to execute recording based on the dot data generated in step S230. That is, the correction recording control unit 12c performs the rasterization processing on the dot data, and transmits the dot data obtained after the rasterization processing, to the printer 20. As a result, the printer 20 executes the recording of the input image on the recording medium 30 based on the dot data transmitted from the recording control device 10.

In description of the flowchart of FIG. 10, an object to be corrected by the correction value is a gradation value for each ink color included in the image data obtained after the color conversion processing of step S210. However, the object to be corrected by the correction value is not limited to such a gradation value. For example, the color conversion lookup table referenced during the color conversion processing may be corrected. That is, the correction recording control unit 12c may correct the values of the CMYK components obtained after the color conversion processing defined by the color conversion lookup table with the correction values for each color and each gradation value. Further, the correction recording control unit 12c may increase or decrease the gradation value of each RGB component of each pixel of the image data before the color conversion processing according to the correction value. In this case, although the correction value calculated as described above cannot be applied to the RGB components as it is, the RGB components can be indirectly corrected by the correction value, by using a predetermined coefficient or calculation formula according to a relationship between an increase and decrease of the RGB components and an increase and decrease of the CMYK components according thereto.

3. Second Embodiment

Figure 12:
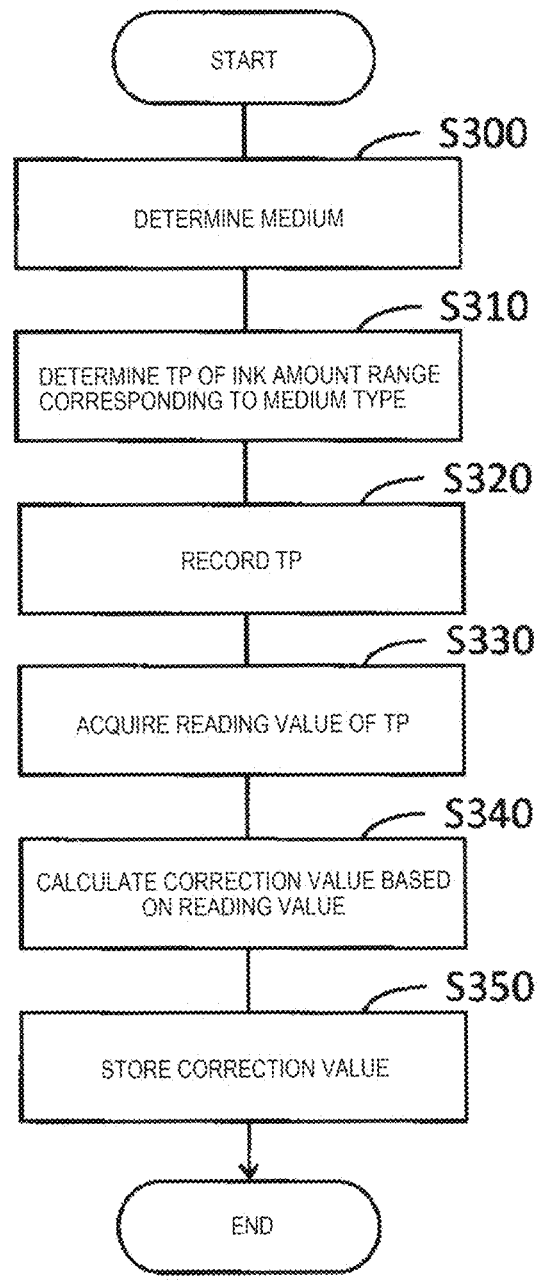
FIG. 12 is a flowchart showing correction value acquiring processing according to a second embodiment.

FIG. 12 is a flowchart showing correction value acquiring processing according to a second embodiment, which is realized by the control unit 11 according to the recording control program 12. In the second embodiment, the description overlapping with the first embodiment is basically omitted. In the correction value acquiring processing according to the first embodiment, the ink amount range of the TP to be referenced for the calculation of the correction value is determined based on the reading values of the TP recorded by the printer 20. In contrast, in the correction value acquiring processing according to the second embodiment, the ink amount range to be referenced for the calculation of the correction value is determined before the recording of the TP, and the recording of the TP in the determined ink amount range is executed by the printer 20.

In step S300, the medium determining unit 12d determines the medium type of the recording medium 30 used for the recording of the TP. For example, the medium determining unit 12d causes the display unit 13 to display a UI screen on which the medium type is input. The user operates the operation receiving unit 14 to input the recording medium 30 used for the recording of the TP on the UI screen, that is, the medium type set in the printer 20. In this way, the medium determining unit 12d can determine what the medium type is, by receiving designation of the medium type from the user through the UI screen.

In step S310, the TP recording control unit 12a determines the TP of the ink amount range corresponding to the medium type determined in step S300.

Figure 13:
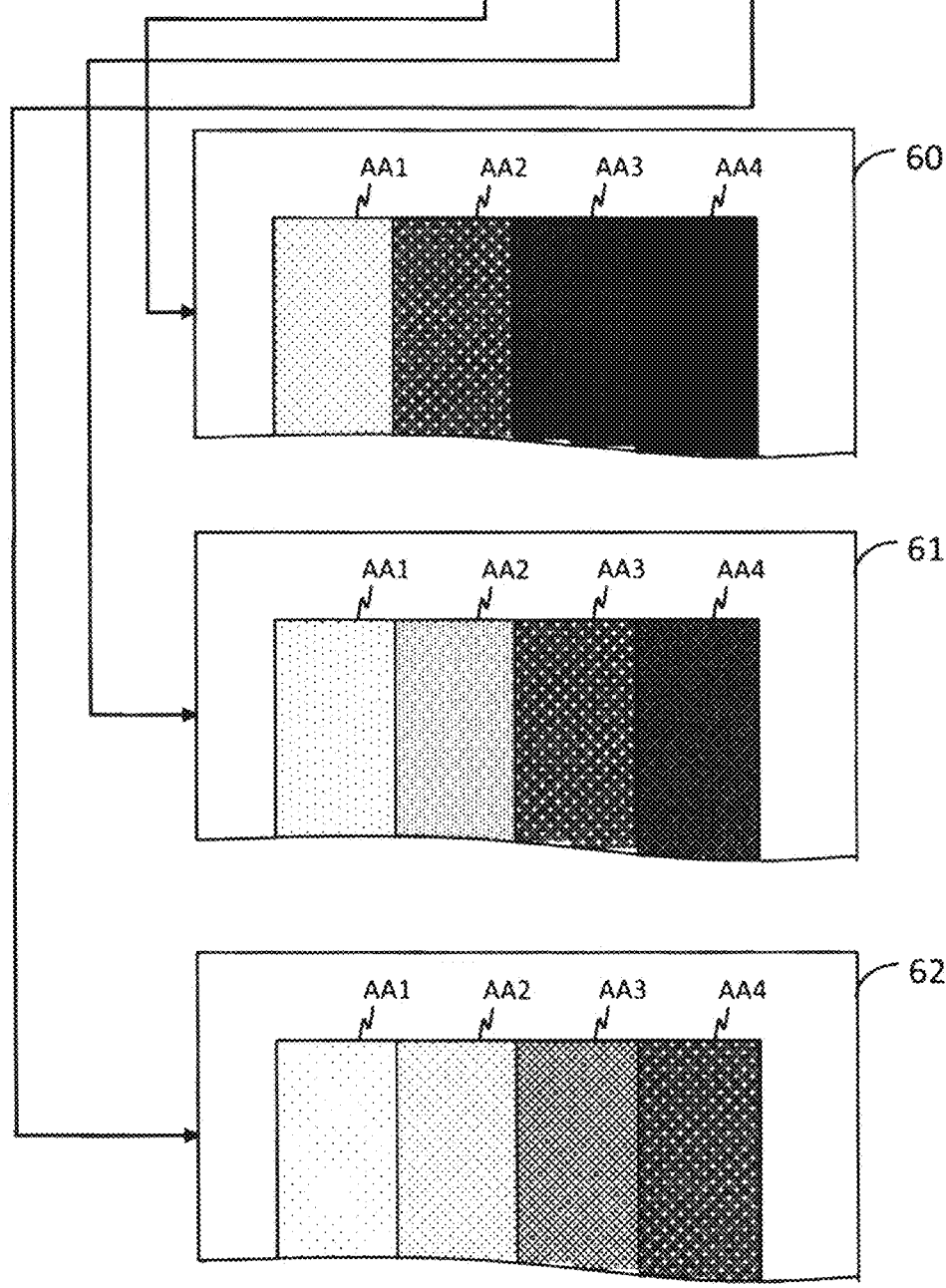
FIG. 13 is a diagram for illustrating examples of steps S310 and S320.

FIG. 13 is a diagram for illustrating examples of steps S310 and S320. An upper part of FIG. 13 shows an ink amount range table 18 defining a correspondence between the medium type and the ink amount range of the TP. The ink amount range table 18 is stored in, for example, the predetermined memory in the recording control device 10 in advance. The TP recording control unit 12a determines the TP to be recorded by the printer 20, based on the medium type determined in step S300 and the ink amount range table 18. The maximum Duty (an ink amount of an ink recording area AA4) for each medium type defined in the ink amount range table 18 has a lower value as the corresponding medium type is a medium type in which the ink is easier to bleed. The maximum Duty according to each medium type defined by the ink amount range table 18 is an upper limit of the Duty at which it is recognized that the ink does not bleed in the corresponding medium type.

In step S320, the TP recording control unit 12a causes the printer 20 to record the TP determined in step S310. Even in the second embodiment, the TP is an image including a plurality of ink recording areas having different amounts of ink. According to the example of FIG. 13, when it is determined in step S300 that the medium type is the dedicated paper sheet, the TP recording control unit 12a causes the printer 20 to record a TP 60 including an ink recording area AA1 with the Duty of 25%, an ink recording area AA2 with the Duty of 50%, an ink recording area AA3 with the Duty of 75%, and the ink recording area AA4 with the Duty of 100%. Further, according to the example of FIG. 13, when it is determined in step S300 that the medium type is the plain paper sheet, the TP recording control unit 12a causes the printer 20 to record a TP 61 including the ink recording area AA1 with the Duty of 18%, the ink recording area AA2 with the Duty of 35%, the ink recording area AA3 with the Duty of 53%, and the ink recording area AA4 with the Duty of 70%. Further, according to the example of FIG. 13, when it is determined in step S300 that the medium type is the recycled paper sheet, the TP recording control unit 12a causes the printer 20 to record a TP 62 including the ink recording area AA1 with the Duty of 13%, the ink recording area AA2 with the Duty of 25%, the ink recording area AA3 with the Duty of 38%, and the ink recording area AA4 with the Duty of 50%.

According to the example of FIG. 13, all the TPs 60, 61, and 62 are images in which the plurality of long ink recording areas AA1, AA2, AA3, and AA4 are arranged in a short direction of each ink recording area. Similar to the TP 50 shown in FIG. 5, the ink recording areas of the TPs 60, 61, and 62 are recorded with the same one-color ink. When the printer 20 is a serial printer as described in FIG. 2, the TP recording control unit 12a records one of the TPs 60, 61, and 62 on the recording medium 30 in a state in which a short direction of each ink recording area corresponds to the direction D1 and a longitudinal direction of each ink recording area corresponds to the direction D2. Meanwhile, when the printer 20 is a line printer as described in FIG. 3, the TP recording control unit 12a records one of the TPs 60, 61, and 62 on the recording medium 30 in a state in which a short direction of each ink recording area corresponds to the direction D2 and a longitudinal direction of each ink recording area corresponds to the direction D1.

For example, TP data, which is image data representing the TP 60, is prepared in advance in a predetermined memory or the like. When causing the printer 20 to record the TP 60, the TP recording control unit 12a may cause the printer 20 to execute the recording by, for example, executing the halftone processing on the TP data representing the TP 60. Meanwhile, when causing the printer 20 to record the TP 61, the TP recording control unit 12a performs correction of the TP data representing the TP 60 in a state in which the respective ink amounts of the ink recording areas AA1, AA2, AA3, and AA4 are set to respective ink amounts regulated by the ink amount range table 18 to correspond to the plain paper sheet. Thus, the TP recording control unit 12a converts the TP data representing the TP 60 into TP data representing the TP 61. Further, when causing the printer 20 to record the TP 62, the TP recording control unit 12a performs correction of the TP data representing the TP 60 in a state in which the respective ink amounts of the ink recording areas AA1, AA2, AA3, and AA4 are set to respective ink amounts regulated by the ink amount range table 18 to correspond to the recycled paper sheet. Thus, the TP recording control unit 12a converts the TP data representing the TP 60 into TP data representing the TP 62. Then, when causing the printer 20 to record the TP 61 or the TP 62, the TP recording control unit 12a may execute the recording by the printer 20, by, for example, executing the halftone processing on the TP data representing the TP 61 or the TP data representing the TP 62, which are converted as described above.

In this way, in a configuration in which one of the different TPs 60, 61, and 62 is recorded according to the medium type of the recording medium 30 used for recording the TP, the TP data representing the one TP 60 is converted into the TP data representing the other TP 61 or TP 62. Accordingly, memory resources for storing the TP data in advance can be saved.

In step S330, the correction value calculating unit 12b acquires a reading value of the TP recorded in step S320.

In step S340, the correction value calculating unit 12b calculates the correction value for correcting the ink amount of each nozzle 23 based on the reading value of the TP acquired in step S330. The description of the first embodiment is applied to a method of calculating the correction value. However, in step S340, the correction value calculating unit 12b may calculate the correction value, by using all the reading values of the TP acquired in step S330, that is, the reading values of respective ink recording areas from the lowest Duty to the highest Duty of the TP recorded on the recording medium 30 in step S320.

Step S350 is the same as step S150.

Figure 14:
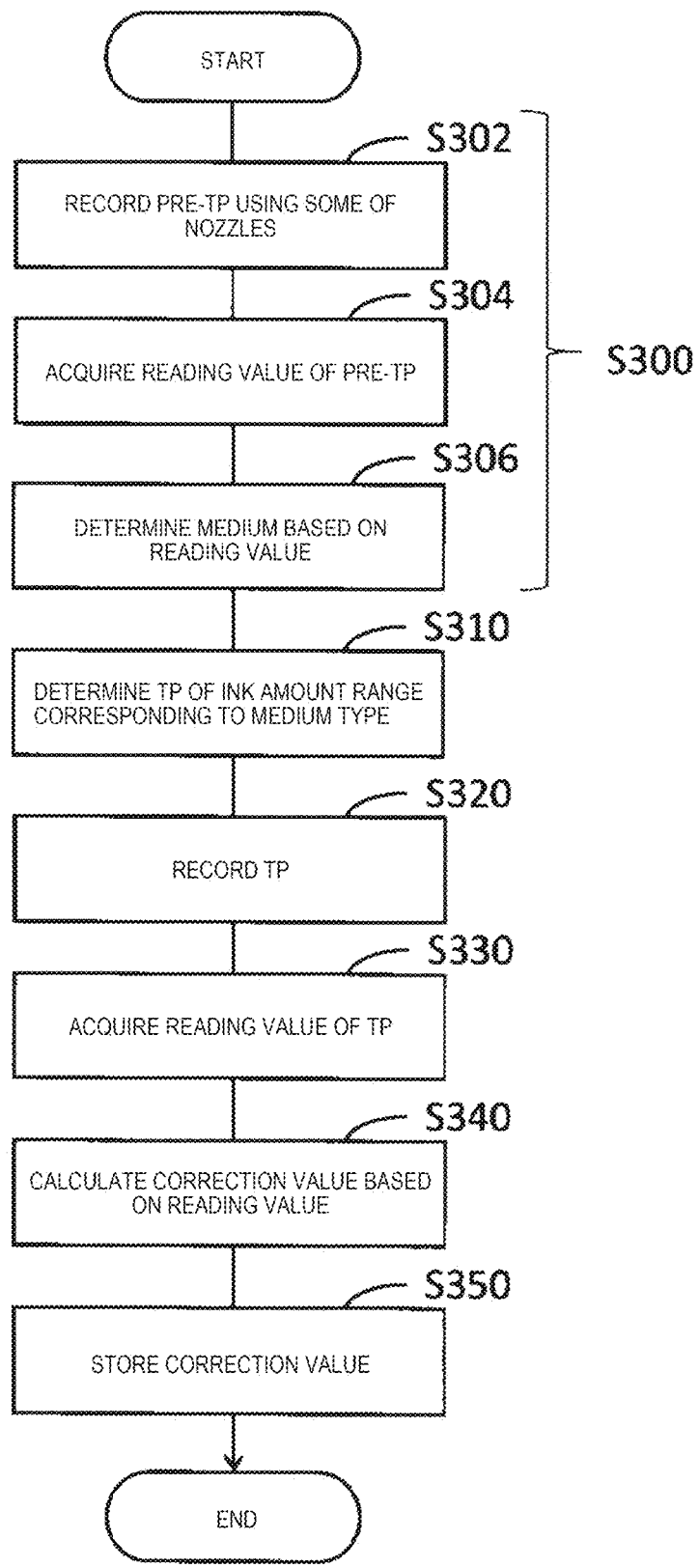
FIG. 14 is a flowchart showing correction value acquiring processing including a specific example of step S300.

FIG. 14 is a flowchart showing the correction value acquiring processing according to the second embodiment and shows a specific example of step S300 in detail in a state in which the specific example is divided into steps S302 to S306. Steps after step S310 of FIG. 14 are the same as steps after step S310 of FIG. 12.

In step S302, the TP recording control unit 12a causes the printer 20 to record a predetermined pre-test pattern (hereinafter, referred to as a pre-TP). The pre-TP is a TP for determining the medium type, but is not a TP for obtaining the reading value used for calculating the correction value. Therefore, the TP recording control unit 12a records the pre-TP on the recording medium 30 by using only some of the nozzles 23 included in the recording head 22, for example, some of the nozzles 23 included in one nozzle row 26. Further, the pre-TP may be any TP suitable for determining the medium type. The pre-TP is, for example, a TP including the ink recording areas A7, A8, A9, and A10 on a high Duty side of the TP 50 shown in FIG. 5.

In step S304, the medium determining unit 12d acquires the reading value of the pre-TP recorded in step S302. That is, the color measuring device 40 measures the color of the pre-TP recorded on the recording medium 30, and the medium determining unit 12d acquires the reading value as a result of the color measurement from the color measuring device 40.

In step S306, the medium determining unit 12d determines the medium type of the recording medium 30, based on the reading value of the pre-TP acquired in step S304. The determination method in step S120 described in the first embodiment may be applied to the determination method in step S306.

In this way, in step S300 of the second embodiment, the medium determining unit 12d does not determine the medium type according to the input from the user, and may determine the medium type based on the reading value of the pre-TP recorded on the recording medium 30.

4. Overview

As described above, according to the present embodiment, the recording control device 10, which controls the printer 20 that performs recording by discharging the ink from the plurality of nozzles 23, includes the TP recording control unit 12a that causes the printer 20 to record the TP including the plurality of ink recording areas having different amounts of ink, the correction value calculating unit 12b that calculates the correction values of the ink amounts of the nozzles 23 based on the reading values of the ink recording areas of the recorded TP, and the correction recording control unit 12c that causes the printer 20 to record an image in which the ink amounts of the nozzles 23 are corrected by the correction value. Then, the maximum ink amount of the ink recording area corresponding to the reading value used by the correction value calculating unit 12b to calculate the correction value is smaller when the medium type of the recording medium 30 on which the TP is recorded is a second recording medium in which the ink is easier to bleed than in the first recording medium than when the medium type of the recording medium 30 on which the TP is recorded is a first recording medium.

According to such a configuration, when generating the correction value based on the reading value of the TP recorded on the recording medium 30, the recording control device 10 can generate the correction value by removing the reading value of the ink recording area in a state in which the ink bleeds, regardless of the medium type of the recording medium 30 used for recording the TP. Thus, an appropriate correction value for correcting the concentration unevenness caused by a variation in discharge characteristics of the ink of each nozzle 23 is generated.

According to the present embodiment, the correction value is generated based on the reading value of the ink recording area in a state in which the ink does not bleed on the recording medium 30, that is, the reading value of a result of the recording in which the variation in the discharge characteristics of the ink of each nozzle 23 clearly appears in the light and shade. Thus, such a correction value may be an appropriate value for the correction processing (step S220 of FIG. 10) not only when an input image is recorded on the same type of the recording medium 30 as the recording medium 30 used for recording the TP but also when the input image is recorded on a different type of the recording medium 30 that is different from the recording medium 30 used for recording the TP. As described above, in the present embodiment, it is possible to obtain a correction value suitable for the correction processing when recording is performed on various types of the recording media 30, based on the reading value of the TP recorded on one type of the recording medium 30.

Further, according to the first embodiment, the correction value calculating unit 12b determines the medium type of the recording medium 30 on which the TP is recorded, based on the reading value of the TP recorded on the recording medium 30, and determines the maximum ink amount depending on a result of the determination.

According to the above configuration, the recording control device 10 can accurately determine the medium type of the recording medium 30 used for recording the TP, because determining the medium type based on the reading value of the TP recorded on the recording medium 30. As a result, the maximum ink amount of the ink recording area corresponding to the reading value to be used for calculating the correction value can be appropriately determined according to the medium type.

Further, according to the second embodiment, the recording control device 10 includes the medium determining unit 12d that determines the medium type of the recording medium 30 used for recording the TP. Then, the TP recording control unit 12a causes the printer 20 to record the TP having a different maximum ink amount of the ink recording area according to a result of the determination by the medium determining unit 12d.

According to the above configuration, before the printer 20 executes the recording of the TP, the recording control device 10 determines the medium type used for recording the TP, and determines the ink amount range of the TP according to the determined medium type. Thus, it is possible to prevent the printer 20 from recording the TP including a part of the ink recording area on a high Duty side which is unnecessary for calculating the correction value.

Further, according to the second embodiment, the TP recording control unit 12a causes the printer 20 to record a predetermined pre-TP before the recording of the TP, and the medium determining unit 12d determines the medium type of the recording medium 30 used for recording the TP, based on the reading value of the recorded pre-TP.

According to the above configuration, the recording control device 10 determines the medium type based on the reading value of the pre-TP, and determines the ink amount range of the TP. Thus, the recording control device 10 can prevent the printer 20 from recording the TP including a part of the ink recording area on the high Duty side which is unnecessary for calculating the correction value.

The recording medium 30 on which the TP is recorded is not limited to the dedicated paper sheet, the plain paper sheet, and the recycled paper sheet, which are described above. Various types of recording media having different bleeding easiness may be targets on which the TP is recorded.

In the present embodiment, when the correction value for each nozzle 23 is calculated, not only a case where the correction value is calculated to correspond to each of all the nozzles 23 of the recording head 22 except the target nozzle but also a case where the correction values are calculated to correspond to some of the nozzles 23 of the recording head 22 except the target nozzle are included.

What is claimed is:

1. A recording control device which controls a recording apparatus that performs recording by discharging ink from a plurality of nozzles, the device comprising:
    a test pattern recording control unit that causes the recording apparatus to record a test pattern including a plurality of ink recording areas having different ink amounts;
    a correction value calculating unit that calculates a correction value of the ink amount of each nozzle, based on a reading value of the ink recording area of the recorded test pattern; and
    a correction recording control unit that causes the recording apparatus to record an image in which the ink amount of each nozzle is corrected by the correction value, wherein
    the maximum ink amount of the ink recording area corresponding to the reading value used by the correction value calculating unit to calculate the correction value is smaller when a medium type of a recording medium on which the test pattern is recorded is a second recording medium in which the ink is easier to bleed than a first recording medium than when the medium type of the recording medium on which the test pattern is recorded is the first recording medium.

2. The recording control device according to claim 1, wherein
    the correction value calculating unit determines the medium type of the recording medium on which the test pattern is recorded, based on the reading value, and determines the maximum ink amount according to a result of the determination.

3. The recording control device according to claim 1, further comprising:
    a medium determining unit that determines the medium type of the recording medium used for recording the test pattern, wherein
    the test pattern recording control unit causes the recording apparatus to record test patterns having different maximum ink amounts of the ink recording areas according to a result of the determination.

4. The recording control device according to claim 3, wherein
    the test pattern recording control unit causes the recording apparatus to record a predetermined pre-test pattern before the recording of the test pattern, and
    the medium determining unit executes the determination based on a reading value of the recorded pre-test pattern.

5. A recording apparatus which performs recording by discharging ink from a plurality of nozzles, the apparatus comprising:
    a test pattern recording control unit that records a test pattern including a plurality of ink recording areas having different ink amounts;
    a correction value calculating unit that calculates a correction value of the ink amount of each nozzle, based on a reading value of the ink recording area of the recorded test pattern; and
    a correction recording control unit that records an image in which an ink amount of each nozzle is corrected by the correction value, wherein
    the maximum ink amount of the ink recording area corresponding to the reading value used by the correction value calculating unit to calculate the correction value is smaller when a medium type of a recording medium on which the test pattern is recorded is a second recording medium in which the ink is easier to bleed than a first recording medium than when the medium type of the recording medium on which the test pattern is recorded is the first recording medium.

6. A recording control method for controlling a recording apparatus that performs recording by discharging ink from a plurality of nozzles, the method comprising:
    causing the recording apparatus to record a test pattern including a plurality of ink recording areas having different ink amounts;
    calculating a correction value of the ink amount of each nozzle, based on a reading value of the ink recording area of the recorded test pattern; and
    causing the recording apparatus to record an image in which the ink amount of each nozzle is corrected by the correction value, wherein
    the maximum ink amount of the ink recording area corresponding to the reading value used for the correction value calculation to calculate the correction value is smaller when a medium type of a recording medium on which the test pattern is recorded is a second recording medium in which the ink is easier to bleed than a first recording medium than when the medium type of the recording medium on which the test pattern is recorded is the first recording medium.

\* \* \* \* \*